P. L. SENNOTT.
STRAINING PAIL.
APPLICATION FILED MAY 23, 1908.

925,040.

Patented June 15, 1909.

WITNESSES:

INVENTOR
Perley L. Sennott.
BY

Attorney

UNITED STATES PATENT OFFICE.

PERLEY L. SENNOTT, OF CHICAGO, ILLINOIS.

STRAINING-PAIL.

No. 925,040.          Specification of Letters Patent.          Patented June 15, 1909.

Application filed May 23, 1908. Serial No. 434,677.

*To all whom it may concern:*

Be it known that I, PERLEY L. SENNOTT, citizen of the United States, residing at Chicago, in the county of Cook and State of Illinois, have invented certain new and useful Improvements in Straining-Pails, of which the following is a specification.

This invention is a strainer, particularly adapted and intended as a strainer for calcimine and similar liquids, and it has for its object to provide means for forcing the material through the strainer and also for freeing the holes therein from lumps or hard particles, which would otherwise tend to clog the device.

At present, in working calcimine, some difficulty is experienced in straining the same, because the lumps or hard particles collect on the straining plate and clog the same, and a person has either to force a brush into the mixture or else insert his hand therein, in order to clear the straining plate. The present invention avoids these inconveniences.

The device is illustrated in the accompanying drawings, in which—

Figure 1:
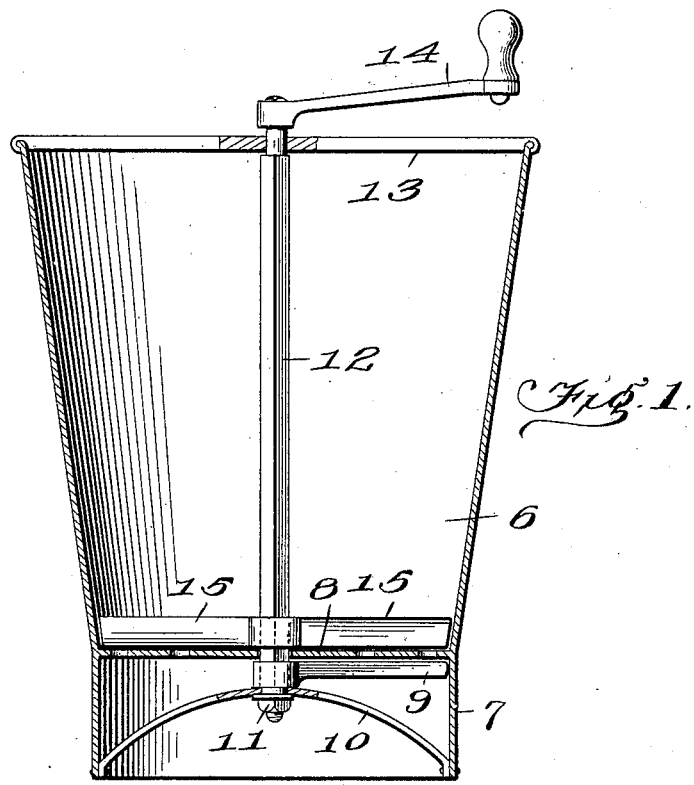
Figure 2:
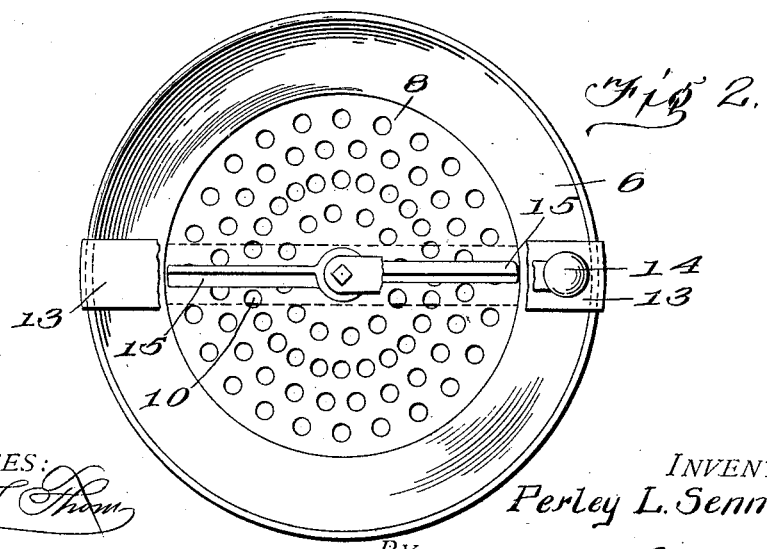

Figure 1 is a vertical section of the same. Fig. 2 is a top plan view.

Referring specifically to the drawings, 6 indicates a straining pail of any desired shape and capacity. This has at the bottom a band 7 on which it stands. The bottom of the pail is formed by a strainer plate 8 set therein at the upper edge of the band.

12 indicates a rod or shaft standing vertically at the center of the pail and having at the top a hand crank 14. This shaft is supported in bearings in a cross bar 13 at the top and a curved cross bar or rod 10 located under the bottom 8. A nut 11, screwed on the lower end of the rod under the lower cross bar, prevents the shaft working up or out. The shaft carries a set of scraper arms 15 projecting therefrom above and in contact with the strainer plate 8. These arms have the form of thin blades resting edgewise on the strainer plate and slightly inclined forwardly with respect to the direction of movement. The shaft also carries an arm 9 which turns therewith in contact with the under side of the strainer plate.

When the calcimine or other liquid is placed in the pail and the crank is turned, the blades 15, scraping over the surface of the strainer, will either crush any lumps and force the same through the holes in the plate or will dislodge such lumps from the holes so as to permit the liquid to flow through the same. The arm 9 scraping against the under side of the plate 8 will dislodge any particles which may gather on the bottom of that plate and so will clean the same and prevent dripping and clogging. A receptacle is placed under the straining pail to receive the liquid which is passed therethrough.

The device will be found very useful for the purpose indicated and will prevent clogging and other inconveniences incident to the use of an ordinary strainer.

I claim:

A straining pail having a perforated bottom, a central vertical shaft therein, and scraper arms projecting from the shaft and rotating in contact with the upper and under surfaces of the said bottom.

In testimony whereof I affix my signature, in presence of two witnesses.

PERLEY L. SENNOTT.

Witnesses:
  NELLIE FELTSKOG,
  H. G. BATCHELOR.